Dec. 11, 1962   J. G. WOHL   3,067,832
VELOCITY MODULATED STEERING SYSTEM
Filed Dec. 16, 1960   2 Sheets-Sheet 1

*INVENTOR.*
JOSEPH G. WOHL

Dec. 11, 1962   J. G. WOHL   3,067,832
VELOCITY MODULATED STEERING SYSTEM
Filed Dec. 16, 1960                                2 Sheets-Sheet 2

*INVENTOR.*

JOSEPH G. WOHL

United States Patent Office 3,067,832
Patented Dec. 11, 1962

3,067,832
VELOCITY MODULATED STEERING SYSTEM
Joseph G. Wohl, Stamford, Conn., assignor to Dunlap and Associates, Incorporated, Stamford, Conn., a corporation of New York
Filed Dec. 16, 1960, Ser. No. 76,326
12 Claims. (Cl. 180—79.2)

This invention refers to steering systems and has particular reference to manually controlled steering systems for vehicles such as airplanes. Although the invention has primary application for aircraft, the present scheme will be applicable also to other motor-powered vehicles such as automobiles, seacraft and space vehicles.

Most people driving an automobile are acquainted with the fact that the effort required by a driver to change the vehicle's direction is dependent upon the speed of the vehicle. For instance, when traveling at 60 miles per hour, a change of driving lanes is accomplished with relatively little effort and in a short time, whereas at low speeds, say five miles per hour, a similar change of lanes in the same amount of time requires a much greater effort. This effect is even more pronounced when directing the course of aircraft and particularly of large aircraft.

The following discussion will use the terms "pilot's transfer gain" and "effort" and for clarity, the pilot's transfer gain shall be defined as the amount of effort required by the pilot or vehicle operator to effect a given rate of change of the vehicle's direction.

In a conventional nose-wheel steering system of an aircraft, the pilot's gain varies non-linearly by a factor of more than 100 to 1 in order to compensate for the increasing sensitivity of steering as speed increases. Furthermore, at high speeds, a large change in pilot's gain is encountered when transferring the steering from nose-wheel steering to rudder steering or vice versa, as is the case in a normal nose-wheel lift off or landing. Not only do both factors seem to make pilot training more difficult, but in addition it has been found that the optimum steering system gain for take-off speed is too insensitive to permit adequate low speed operations, such as taxiing and parking. As a result, non-linear or piece-wise linear steering system gains are in use or have been proposed at various times.

In spite of these proposals for modified steering systems, most known systems still fail to avoid wide variations in the effort required by the pilot operating the steering control for effecting a rate of change of direction of the vehicle as the vehicle either increases or decreases its speed.

It is therefore an object of the present invention to provide a novel, manually operated steering system for aircraft and similar vehicles, which system avoids one or more of the limitations and disadvantages of prior art devices.

Another object of this invention is the provision of a manual steering system for aircraft or similar vehicles which reduces the variation of effort required at the steering control of a vehicle for effecting a rate of change of direction of the vehicle at varying speeds.

Another object of this invention is the provision of a manually operated steering system for aircraft or similar vehicles, which system maintains the effort required for effecting a rate of change of direction of the vehicle substantially constant as the speed of the vehicle increases or decreases.

A further object of this invention is the provision of a steering system for aircraft wherein the pilot's transfer gain can be kept constant at varying ground speeds.

A still further object of this invention is the provision of a steering system adapted to be operated by a pilot or other operator and which system can be adjusted for the wheel base of the vehicle in order to render the pilot's effort substantially insensitive to vehicle size.

Other and further objects of this invention will be apparent by referring to the following description taken in conjunction with the accompanying drawings in which.

Figure 1:
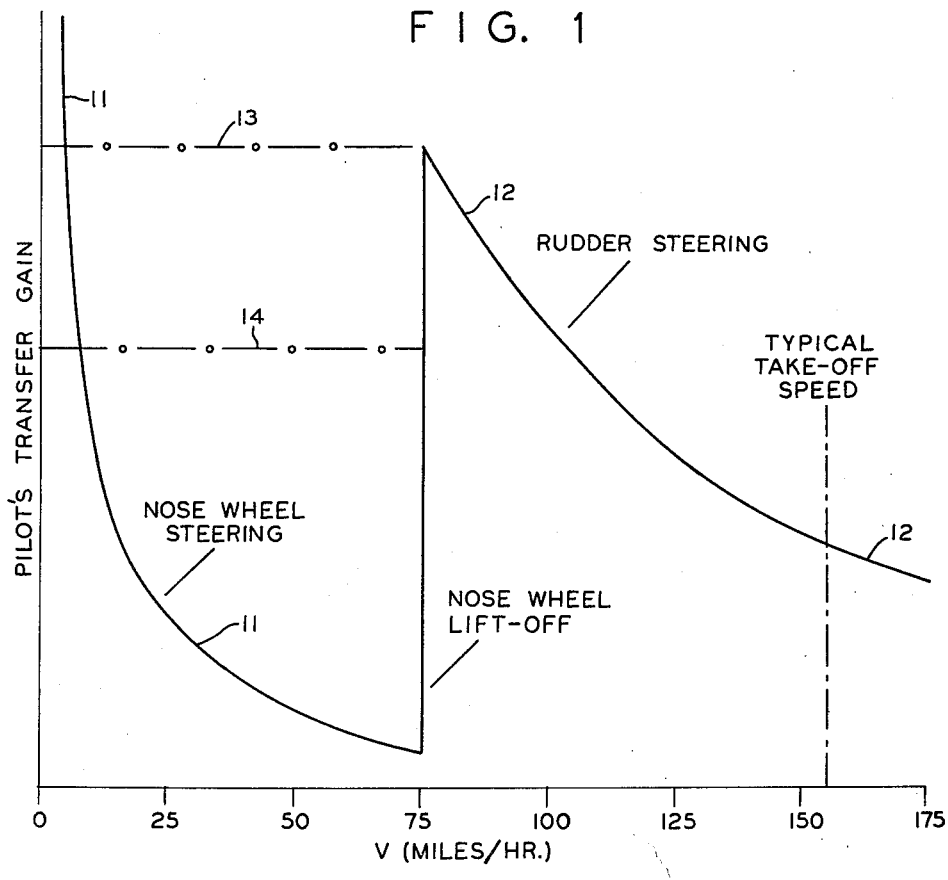
FIGURE 1 is a graph illustrating the variation in pilot's transfer gain versus various speeds of a typical aircraft.

Referring now to the figures and FIGURE 1 in particular, the variation of the pilot's effort called "pilot's transfer gain" is depicted by referring to the curve carrying reference numeral 11. In a typical airplane, nose-wheel steering is used at speeds between 0 and 75 miles per hour and as the aircraft increases its speed, the pilot's transfer gain decreases rapidly. In the particular example shown, at 75 miles per hour, the nose-wheel lifts off and therefore becomes ineffective for steering. From this moment on rudder steering is used which starts at a comparatively high value of pilot's transfer gain and decreases as the speed of the aircraft increases to the typical take-off speed at about 155 miles per hour, and decreases further thereafter, see curve 12.

Figure 3:
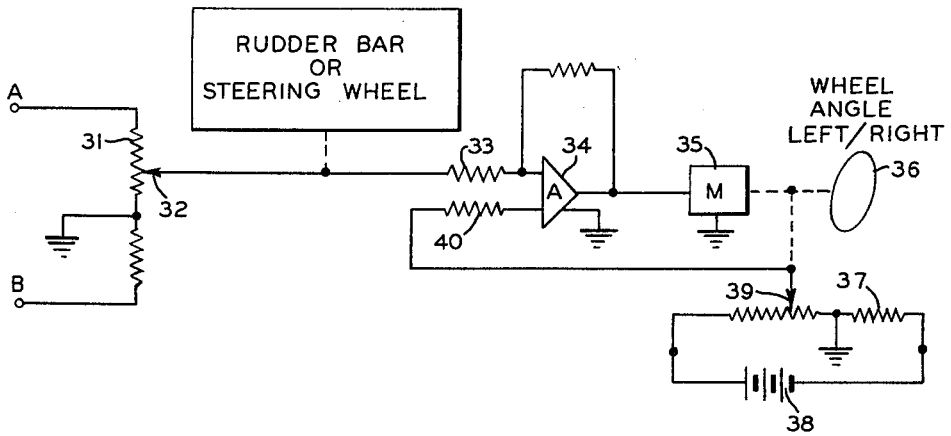
FIGURE 3 is a schematic circuit diagram of a typical steering control mechanism existing in aircraft.

Referring now to FIGURE 3, the simplified circuit diagram of a conventional steering mechanism is shown which results in the behavior plotted in FIGURE 1. A potentiometer 31 is energized from a constant voltage supply connected across input terminals A and B. The slider 32 of potentiometer 31 is positioned by the pilot when operating the rudder bar or steering wheel controls of the aircraft. As the pilot operates these controls, the slider is positioned in varying degrees for either a left or a right turn and hence, the slider applies via a series input resistor 33 an electrical signal to servo amplifier 34. The output from the servo amplifier is applied to a servo motor 35 which mechanically positions the aircraft nose-wheel 36 in response to the signal received by the motor. A potentiometer 37 energized from a source of energy 38 has its slider 39 mechanically coupled to the wheel so that the slider develops a signal corresponding to wheel angle. This signal is used as a feedback signal and fed via resistor 40 to amplifier 34. In this manner, potentiometer 37 serves to develop a feedback signal and compares the "command" position developed at slider 32 with the "present" position resulting from the position of slider 39. When both signals coincide, amplifier 34 produces substantially no signal and motor 35 stands still. The circuit shown is a conventional servomechanism whose operation is well understood by those skilled in the art.

The improvement effected in the present arrangement comprises the removal of the constant potential from across terminals A and B in FIGURE 3 and providing instead a voltage which is responsive to the speed of the vehicle and in this instance to the ground speed of the aircraft. Since the effort of the pilot decreases with increasing vehicle speed, the signal across terminals A and B should be responsive to the speed of the vehicle and must be decreasing with increasing speed.

Figure 2:
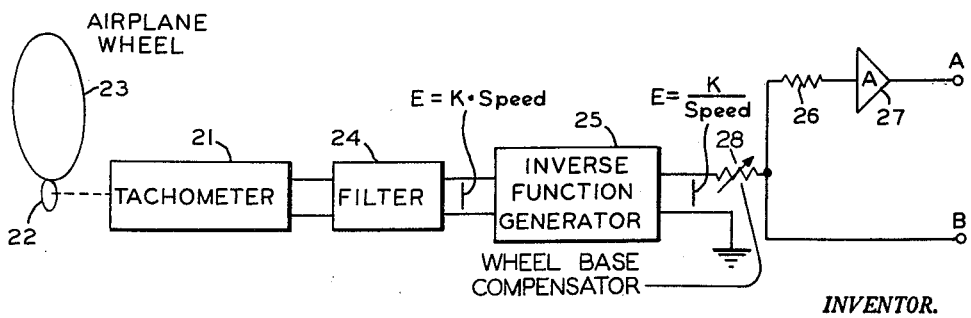
FIGURE 2 is an electrical circuit diagram for developing a signal responsive to the speed of an aircraft.

FIGURE 2 shows a typical circuit for developing a signal adapted to energize terminals A and B in FIGURE 3. A tachometer 21 is mechanically coupled by means of a wheel, gear, pulley, or other means 22 to an appropriate aircraft wheel so as to produce at the tachometer a signal which is responsive to the ground speed of the aircraft. This signal is applied to a filter 24 in order to remove undulations. The signal produced as output from the filter circuit 24 is then a direct current signal E which equals a constant times the ground speed of the aircraft. From there, the signal is applied to an inverse function generator 25 to produce a signal which is inversely proportional to the speed, that is a signal of large amplitude at substantially zero speed and a diminishing signal as the aircraft speed increases. From the inverse function generator 25 the signal is directly connected to terminal B while the same signal to terminal A is fed through an input resistor and inversion amplifier, numerals 26 and 27. In this manner, the signals at terminals A and B are of opposite polarity with respect to one another. A variable resistor 28 serves as a wheel base compensator in order to provide a larger signal for large wheel base aircraft and a smaller signal for aircraft having a proportionally shorter wheel base. As is well known in conjunction with automobiles, the steering effort is greater with a large vehicle than with a smaller vehicle and thus, the effort depends on the wheel base.

When connecting the circuit per FIGURE 2 to the circuit per FIGURE 3, a substantially constant pilot's transfer gain is obtained as mathematics developed for this concept has shown that for this condition to exist, the steering system must be so designed that the nose-wheel angle is directly proportional to the product of applied rudder pedal force and wheel base and inversely proportional to ground speed. With a signal inversely proportional to ground speed applied to the servo mechanism per FIGURE 3, the pilot's transfer gain will remain constant and depending on the magnitude of the signal, the pilot's effort can be shifted as illustrated for instance by lines 13 and 14 in FIGURE 1. By suitably dimensioning the signal as indicated at line 13, the pilot's transfer gain can be maintained constant during the time that the nose-wheel is effective and then be decreasing with rudder steering in the conventional manner.

The system thus obtained exhibits a constant gain on the pilot's part, regardless of the speed of the vehicle. Lateral acceleration of the aircraft as it speeds down the runway remains directly proportional to the force applied by the pilot to the rudder bar or wheel regardless of speed. At the instant of nose-wheel lift off, the normal travel of the rudder bar throughout the take-off run is adequate for rudder control without the large change in gain normally required of the pilot during this transition.

Figure 4:
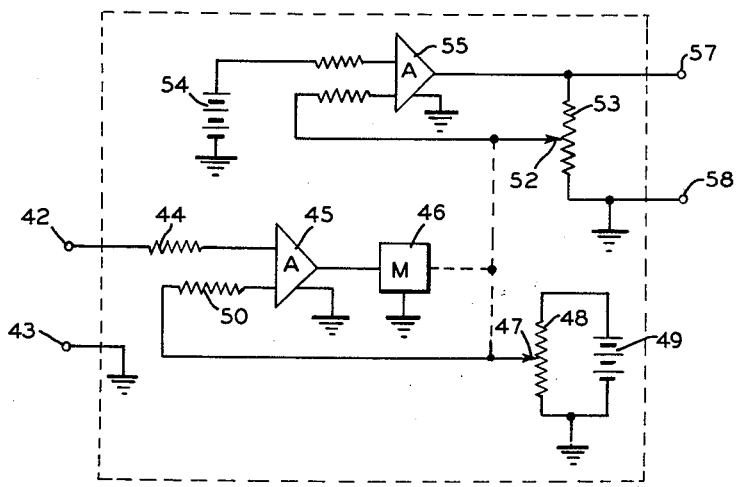
FIGURE 4 is an electrical circuit diagram of an inverse function generator which is required in conjunction with the circuit per FIGURE 2.

FIGURE 4 depicts a typical inverse function generator shown in block form in FIGURE 2. The input signal responsive to speed is applied at terminals 42 and 43 and is received by a series input resistance 44 and servo amplifier 45, the latter supplying a signal to servo motor 46. Motor 46 drives the slider 47 of a feedback potentiometer 48 which is energized from a source of potential 49. The potentiometer 48 and slider 47 provide a feedback signal to amplifier 45 via series input resistor 50. Thus, slider 47 is positioned in accordance with the magnitude of the input signal applied at terminals 42 and 43. Motor 46 is coupled also to drive slider 52 of potentiometer 53. This potentiometer is energized from an amplifier 55 which is connected via an input resistor to source 54. Slider 53 provides a feedback signal to the amplifier and adjusts the output therefrom. Since sliders 47 and 52 are driven in unison and in response to the input signal applied at terminals 42 and 43, and since potentiometer 53 can be phased such that its output signal across terminals 57 and 58 decreases as the input signal increases, a signal inversely proportional to speed is obtained. It will be understood by those skilled in the art that the circuit shown in FIGURE 4 represents a typical inverse function generator and that many other and similar circuits may be used for generating the inverse value of an applied signal, which circuits are well known in the art of analog computing devices.

Figure 5:
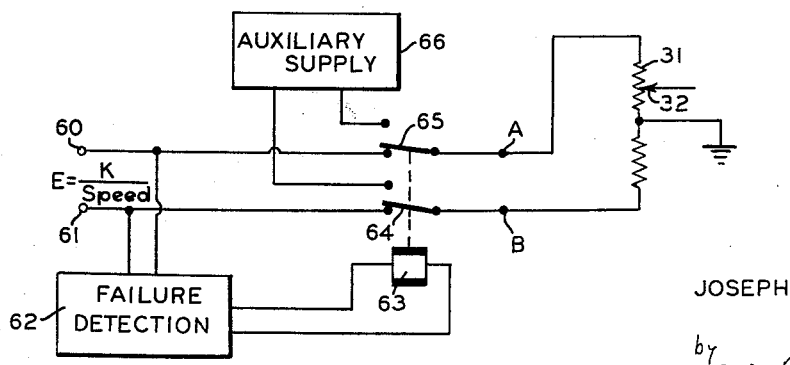
FIGURE 5 is a schematic electrical circuit, partly in block form, illustrating a safety feature which advantageously is incorporated in the circuit per FIGURES 2 and 3.

FIGURE 5 shows a modification of the circuit per FIGURES 2 and 3 and refers primarily to a safety feature. In the event that tachometer 21, FIGURE 2, is defective, or in the event that voltage source 54 or amplifier 55 would fail, the servomechanism of the steering system obtains either a signal of too large or too low an amplitude. To avoid such occurrence, a failure detection circuit is interposed between the circuits of FIGURE 2 and FIGURE 3. The signal inversely proportional to speed applied at terminals 60 and 61 is received by a failure detecting circuit 61 which senses whether the signal is within proper operating range. If the signal is within this prescribed range, relay 63 is energized, thus maintaining associated contacts 64 and 65 in their lower position, thereby permitting the signal from terminals 60 and 61 to pass to terminals A and B. In the event that the signal is outside of the predetermined limits, relay 63 is deenergized so that contacts 64 and 65 assume their upper position, in which event an auxiliary voltage supply 66 supplies a constant potential to terminals A and B. In this latter position, the steering system is restored to a line along curve 11 in FIGURE 1, the previous condition. In an alternative manner, circuit 62 may comprise a conventional voltmeter read by the operator and relay 63 a manually operated transfer switch under the operator's control.

The velocity modulated steering system described heretofore will be found to be safer and easier to learn by vehicle operators, aircraft pilots and copilots. Also, by selecting the circuit parameters and constants in a suitable manner, it is possible to limit the lateral G-loads on the aircraft landing gear resulting from abrupt turn commands. This system permits moreover, optimizing of steering system parameters from the standpoint of pilot-aircraft interaction and response. Still further, the signal may be adjusted to take into account variations in runway surface condition.

Although it is shown that with a signal inversely proportional to speed, a substantially constant pilot's transfer gain is achieved, further experimentation and practice may prove that a slight slope or incline in the gain characteristic is desirable for transition from one system to the other or for adapting the system to individual operator preference. It will be apparent that such a change is readily accomplished by modifying the speed responsive signal as for instance by using a non-linear potentiometer 53 or a non-linear amplifier 55.

Moreover, it shall be clearly understood by those skilled in the art that the system disclosed herein may operate either with alternating current signals or direct current signals and that the servomechanisms and positioning motors may operate with electrical or hydraulic signals or such other power transfer means as are well known in the art.

While there has been described and illustrated a certain concept and embodiment of the present invention and a modification thereof, it will be apparent to those skilled in the art that further and other modifications and changes may be made therein without departing from the spirit and intent of the present invention which shall be limited only by the scope of the appended claims.

What is claimed is:

1. In a steering system for an aircraft or similar vehicle, the combination of: a steering control adapted to cause when operated the vehicle to change its direction; a vehicle instrumentality causing the vehicle when in motion to change its direction in response to the operation of the steering control; a servomechanism interconnecting said steering control and said vehicle instrumentality; means for producing a signal which is substantially inversely proportional to the speed of said vehicle relative to the medium with which the vehicle and the instrumentality is in contact, and means applying said signal to the servomechanism to decrease the variation of effort required at the steering control for effecting a rate of change of direction of the vehicle at varying speeds.

2. In a steering system for an aircraft or similar vehicle adapted to be operated on ground, the combination of: a steering control adapted to cause when operated the vehicle to change its direction; a vehicle instrumentality causing said vehicle when in motion relative to ground to change its direction; a servomechanism interconnecting said control with said instrumentality to cause said instrumentality to be positioned in response to the operation of said steering control, and means for producing a signal substantially inversely proportional to the ground speed of said vehicle and applying the signal as in input to the servomechanism to decrease the variation of effort required at the steering control for effecting a rate of change of direction of the vehicle at varying speeds.

3. In a steering system for an aircraft or similar vehicle adapted to be operated on ground, the combination of: a steering control adapted to cause when operated the vehicle to change its direction; a vehicle instrumentality in contact with the ground for causing the vehicle when in motion relative to ground to change its direction; a servomechanism interconnecting said control with said instrumentality to cause said instrumentality to be positioned in response to the operation of said steering control; means for producing a signal substantially inversely proportional to the ground speed of said vehicle, and means applying said speed signal as an input signal to the servomechanism for causing the servomechanism to receive a signal of larger magnitude at low ground speed than at high speed whereby to decrease the variation of effort required at the steering control for effecting a rate of change of direction of the vehicle at varying speeds.

4. In a steering system for an aircraft or similar vehicle adapted to be operated on ground, the combination of: a steering control adapted to cause when operated the vehicle to change its direction; a vehicle instrumentality in contact with the ground for causing the vehicle when in motion relative to ground to change its direction; a servomechanism interconnecting said control with said instrumentality to cause said instrumentality to be positioned in response to the operation of said steering control; means for producing a signal substantially inversely proportional to the ground speed of said vehicle and substantially proportional to the length of the wheel base of said vehicle, and means applying said signal as an input signal to the servomechanism for causing the servomechanism to receive a signal which decreases in magnitude with increasing ground speed whereby to decrease the variation of effort required at the steering control for effecting a rate of change of direction of the vehicle at varying speeds.

5. In a steering system for an aircraft or similar vehicle adapted to be operated on ground, the combination of: a steering control adapted to cause when operated the vehicle to change its direction; at least one front wheel and one rear wheel extending from the vehicle for supporting the latter on ground and the distance between the wheels defining the wheel base of the vehicle; one of said vehicle wheels in contact with the ground for causing the vehicle when in motion relative to ground to change its direction; a servomechanism which includes amplifying means and motive means interconnecting said control with said wheel to cause said wheel to be positioned in response to the operation of said steering control; means for producing a signal which decreases in magnitude with increasing ground speed of said vehicle, and means applying said signal to the servomechanism for decreasing the variation of effort required at the steering control for effecting a rate of change of direction of the vehicle at varying speeds.

6. In a steering system as set forth in claim 5 wherein the signal which decreases in magnitude with increasing ground speed is substantially inversely proportional to ground speed of the vehicle.

7. In a steering system as set forth in claim 5 wherein the signal which decreases in magnitude with increasing ground speed is substantially inversely proportional to ground speed of the vehicle and the magnitude of the signal is substantially proportional to the length of the wheel base.

8. In a steering system for an aircraft or similar vehicle adapted to be operated on ground, the combination of: a steering control adapted to cause when operated the vehicle to change its direction; a vehicle wheel in contact with the ground for causing the vehicle when in motion relative to ground to change its direction; a servomechanism which includes amplifying means and motive means interconnecting said control with said wheel to cause said wheel to be positioned in response to the operation of said steering control; means for producing a first signal which decreases in magnitude with increasing ground speed of said vehicle; means providing a second substantially constant magnitude signal, and electrical switching means connected to receive said first and second signals and adapted to selectively supply said first or second signal to the servomechanism.

9. In a steering system as set forth in claim 8 wherein sensing means cooperating with said switching means cause normally said first signal to be supplied to the servomechanism while causing the second signal to be supplied to the servomechanism when the magnitude of said first signal falls outside of predetermined limits.

10. In a steering system for an aircraft or similar vehicle adapted to be operated on ground, the combination of: a steering control adapted to cause when operated the vehicle to change its direction; a vehicle wheel in contact with the ground for causing the vehicle when in motion relative to ground to change its direction; a supply of energy; means for deriving a variable signal from said supply and said means being coupled to said steering control to cause said variable signal to vary in response to the setting of the steering control; a servomechanism which includes amplifying means receiving said variable signal as its input; said wheel coupled to said servomechanism for positioning the wheel in response to the setting of said steering control; means for generating a signal substantially inversely proportional to the speed of said vehicle, and means causing said signal inversely proportional to speed to be applied to said source of energy for modifying the latter proportionately, whereby to maintain the steering effort substantially constant with varying ground speed.

11. In a steering system for an aircraft or similar vehicle adapted to be operated on ground, the combination of: a steering control adapted to cause when operated the vehicle to change its direction; a vehicle wheel in contact with the ground for causing the vehicle when in motion relative to ground to change its direction; a supply of energy; means for deriving a variable signal from said supply and said means being coupled to said steering control to cause the magnitude of said variable signal to vary in response to the setting of said steering control; a servomechanism which includes amplifying means connected for receiving said variable signal as its input; said wheel coupled to said servomechanism for causing the wheel to be positioned in response to the setting of said steering control; means for generating a signal substantially inversely proportional to the speed of said vehicle, and means for causing the latter signal to be applied to said source of energy for causing said source to provide to said amplifying means signals whose magnitude is substantially inversely proportional to speed when the steering control setting is maintained substantially constant.

12. In a steering system for an aircraft or similar vehicle adapted to be operated on ground, the combination of: a steering control adapted to cause when operated the vehicle to change its direction; at least one front and one rear wheel extending from the vehicle for supporting the latter on ground and the distance between the wheels defining the wheel base of the vehicle; said front wheel in contact with ground for causing the vehicle when in motion relative to ground to change its direction; a supply of energy; means for deriving a variable signal from said supply and said means being coupled to said steering control to cause said variable signal to vary in response to the setting of said steering control; a servomechanism which includes amplifying means connected for receiving said variable signal as its input; said front wheel coupled to said servomechanism for positioning said wheel in response to the setting of said steering control; means for generating a signal substantially inversely proportional to the speed of the vehicle; means causing said signal inversely proportional to speed to be coupled to said source of energy for modifying the latter proportionately whereby the signal available therefrom at constant setting of said steering control decreases substantially proportional with increasing speed, and further means for causing said input signal to the amplifying means to be proportionate to the length of said wheel base.

References Cited in the file of this patent
UNITED STATES PATENTS

| | | |
|---|---|---|
| 2,734,589 | Groen | Feb. 14, 1956 |
| 2,819,092 | Proctor et al. | Jan. 7, 1958 |
| 2,893,504 | Jackson | July 7, 1959 |
| 2,909,852 | Stern et al. | Oct. 27, 1959 |
| 2,957,535 | Helgeson | Oct. 25, 1960 |
| 2,962,108 | Bidwell | Nov. 29, 1960 |